2,824,810

PROCESS FOR FIRMING CHERRIES

Dante G. Guadagni, Lafayette, Calif., assignor to United States of America as represented by the Secretary of Agriculture No Drawing. Application March 18, 1957
Serial No. 646,938

3 Claims. (Cl. 99—193)

(Granted under Title 35, U. S. Code (1952), sec. 266)

A non-exclusive, irrevocable, royalty-free license in the invention herein described, for all governmental purposes, throughout the world, with the power to grant sublicenses for such purposes is hereby granted to the Government of the United States of America.

This application is a continuation in part of my copending application for patent Serial No. 449,281, filed Aug. 11, 1954, issued as Patent No. 2,788,281.

This invention relates to and has among its objects the provision of methods for treating cherries for the purpose of increasing the quality of the fruit. A particular phase of the invention concerns procedures wherein cherries are subjected to a conditioning operation whereby to increase the quality of the fruit, particularly to cause a firming of the fruit tissue. Additional objects of the invention will be evident from the following description.

As well known in the industry, considerable quantities of red sour cherries are preserved by freezing. This product is commercially produced by packing the cherries, whole or pitted, in cartons together with about one-quarter of their weight of sucrose or an equivalent amount of syrup (sugar dissolved in water). The container is then closed and subjected to freezing. To prevent browning, ascorbic acid may be added to the sugar or syrup or the fruit may be pre-treated with sulphur dioxide or other sulphiting agent such as sodium bisulphite. The resulting product is a wholesome and nutritious food. However, in many cases the product after thawing is found to be undesirably soft in texture. When the product is to be used in cooking, as in preparing pies or other bakery products, the additional softening effect of the cooking treatment renders the fruit almost mushy.

It has now been found that the problem of soft texture outlined above can be alleviated in a simple yet effective manner. This is done by first freezing the cherries and then subjecting them to what is termed a conditioning treatment. This treatment involves holding the cherries in a thawed or unfrozen state, preferably at a temperature just above their freezing point from about ½ to about 6 days. During this conditioning treatment certain physical and/or chemical changes take place whereby the fruit tissue becomes firm. After the conditioning treatment, the cherries may be consumed or otherwise utilized without further treatment. If the cherries are to be stored they are re-frozen and maintained in frozen storage until ready to be consumed. During such refreezing and storage the cherries will retain the enhanced firmness developed during the conditioning treatment. Thus when the products are eventually thawed for consumption they will be found to be desirably firm in texture.

It is to be noted that the firming effect of the conditioning treatment is peculiar to cherries. It has not been found to take place with any other fruits. It is also to be emphasized that it is essential to freeze the cherries prior to the conditioning treatment. In the absence of prior freezing no increase in tissue firmness is obtained.

In applying the process of the invention, the cherries may be processed in their whole state or they may be pitted or cut into pieces. Usually they are merely pitted before being subjected to the freezing and subsequent steps. In order to prevent browning, the cherries are preferably treated with a chemical agent, for example, sulphur dioxide, sodium sulphite, sodium bisulphite, or ascorbic acid.

The cherries may be frozen in any of the ways as well known in the trade. For instance, they may be frozen in containers or on trays in tunnel or blast freezers.

The frozen cherries directly after freezing, or after storage at freezing temperatures, are subjected to the conditioning treatment. This is accomplished by simply placing the frozen cherries in a zone maintained at a temperature just above the freezing point of the cherries, such conditions being maintained for a period of time sufficient to allow the tissue firming to take place. The frozen cherries will, of course, thaw when subjected to these conditions. If desired, the frozen cherries may be deliberately thawed by other means and then directly without any delay subjected to the conditioning treatment. The conditioning temperature to be used with any particular batch of cherries will depend on the composition of the cherries, particularly their solids content. Thus fruit with a low solids content will have a relatively higher freezing temperature than fruit of higher solids content. In general the conditioning temperature may be from about 25° F. to about 35° F. and it is preferred to employ a temperature within this range which is just above the freezing point of the cherries, that is, about 0.5 to 5° F. above the freezing point. Under such conditions the treatment will operate satisfactorily and there will be no danger of microbial spoilage during the conditioning treatment. The firming of the cherry tissue does not occur rapidly and sufficient time must be allowed for the firmness to develop. This time will vary depending on the maturity and composition of the cherries and may take from ½ day, preferably 1 day to about 6 days. In any particular case the time necessary for proper firmness development can be easily determined by checking the texture of the cherries with suitable instruments and discontinuing the conditioning when the desired degree of firmness is established.

After the conditioning operation is completed, the cherries may be treated in various ways. Thus for example the conditioned cherries may be frozen and maintained in frozen storage. In the alternative, the conditioned cherries may be subjected to dehydration to reduce their moisture content to a low level so that the product will be self-preserving. The conditioned cherries may also be preserved by canning. Other preservative methods such as brining, candying, etc. may be applied to the conditioned cherries. If the conditioned cherries are not to be preserved they may be consumed directly or used in the preparation of pies, tarts, cakes or the like

EXAMPLE I

A lot of fresh, pitted, red sour cherries having their natural moisture content and containing no added material was frozen by subjection to an air blast at minus 20° F. The frozen cherries were divided into four samples. One sample was stored in a freezer at minus 10° F. for 5 days; the other three samples were stored in a refrigerator at 34° F. for 5 days.

Measurements were made of the firmness of the cherry tissue of the products immediately after freezing and after the storage periods. These firmness tests were made by placing the thawed cherries in a conventional "Tenderometer" and measuring the force required for the blades to cut through the fruit. The results obtained are tabulated below:

| Sample | Storage conditions | Firmness, lbs. per sq. in. |
|---|---|---|
| a (control) | none | 42 |
| b (control) | 5 days at minus 10° F | 42 |
| c | 5 days at 34° F | 73 |
| d | do | 76 |
| e | do | 76 |

It is evident from the above data that the previously frozen cherries which were maintained at 34° F. for 5 days showed a greatly increased tissue firmness whereas the product stored in the frozen state at minus 10° F. (sample b) did not increase in firmness.

In the process as illustrated in Example I, the cherries were subjected to the conditioning without adding any material whatever so that it is evident that the increase in firmness is attributable solely to the effect of the conditioning treatment.

It is within the purview of this invention to utilize the conditioning treatment to effect other quality improvements in addition to causing a firming of the cherry tissue. Thus the conditioning treatment may be used to impregnate the cherry tissue with sugar (or other food ingredient) simultaneously with effectuating the tissue firming. To this end, the cherries during the conditioning are maintained in contact with a solution or dispersion of a food ingredient, for example, sugar. It is to be noted that cherries are the only fruit which we have found to undergo increase of firmness when subjected to this impregnation treatment. This aspect of the invention is further explained as follows:

When cherries packed with sugar or sugar syrup are frozen in conventional manner, it is found that the cherries themselves are quite tart. Further, their tartness is psychologically intensified to the consumer's palate when the product is eaten because of the sharp contrast between the tartness of the fruit and the sweetness of the surrounding syrup. The industry has long sought for a method by which cherries could be internally sweetened to obviate this contrast in taste between fruit and syrup. Thus various techniques have been advocated to accomplish such an end. For example, one recommended procedure is to apply dry sugar or syrup to the cherries and then permit the mixture to stand for some time prior to freezing. Such a technique will cause some of the sugar to enter the fruit tissue but the rate of internal sweetening which occurs is very slow and usually such standing for a day or two will increase the sugar content of the fruit by about 5% at the maximum. Another technique known in the art involves subjecting a mixture of the fruit and syrup to a vacuum followed by release of the vacuum whereby to cause syrup to be drawn into the fruit tissue. This technique gives a greater increase in internal sugar content but is truly effective only with fruits like apples and pears, the tissue of which normally contains a substantial proportion of air whereby the space formerly occupied by air can be filled with the syrup. However, even with vacuum impregnation it is impossible to bring the sugar content of the fruit up to the same level as the sugar content of the syrup. As a result tart fruit impregnated with syrup will still exhibit a strong taste contrast as compared with the syrup surrounding it.

The problem outlined above can be readily alleviated by application of the process of this invention, namely, by conditioning the fruit while in contact with a sugar solution. As an example of the procedure, frozen cherries are prepared in the conventional manner, that is, the fruit is packed into a container together with dry sugar or sugar syrup. The sugared fruit is then frozen in the usual way. After the product has been frozen it is removed from the freezer and subjected to the conditioning treatment described above. After the conditioning operation, the product may be consumed or otherwise utilized without further treatment. If the product is to be stored it may be re-frozen or preserved in other ways as by dehydration, canning, brining, etc.

When carrying out the conditioning in this manner, the fruit is in contact with the syrup surrounding it and sugar will diffuse from the syrup into the fruit tissue. This conditioning is so effective that the sugar content of the fruit will become equal to the sugar content of the syrup. Thus originally the fruit has a lower sugar concentration than the surrounding syrup. As the conditioning proceeds, sugar diffuses into the fruit tissues with the result that the sugar content of the fruit increases whereas the sugar content of the syrup decreases. Finally an equilibrium point is reached at which the sugar contents of the tissue and syrup are equal. Such a result, that is, such an exhaustive absorption of sugar by the fruit cannot be obtained by the previously known method, that is where the untreated fruit is simply allowed to stand in contact with sugar or syrup prior to freezing. Thus my researches have shown that the freezing must take place prior to the conditioning operation to obtain a high degree of sugar absorption into the fruit tissues in a practical period of time. It is also to be noted that the absorption of sugar is accompanied by firming of the fruit tissue as previously explained.

Although the above discussion is concerned with the absorption of sugar into the fruit tissue, the invention also encompasses the conditioning of cherries under such circumstances as to cause the fruit to absorb any desired soluble ingredient with simultaneous firming of the cherry tissue. Thus instead of sugar, the substance may be a flavoring agent, a nutritive agent, a coloring material, a preserving agent, a flavor-intensifying agent or any combination of these. The nature of the substance is immaterial as the same effect will take place. Examples of food ingredients which may be incorporated in water or other edible liquid to form the impregnating liquid are set forth below:

Sweetening agents: sucrose, dextrose, fructose, maltose, invert sugar, corn syrup, molasses, maple sugar or syrup, etc. For the so-called "dietetic" foods, saccharin or sodium cyclamate may be used. Particularly desirable sweetening agents are the concentrated fruit juices and especially full-flavored concentrates, that is, those in which the volatile essences usually lost in evaporative techniques are recovered by condensation or other means and returned to the concentrate. Fruit juice concentrates are desirable in that they not only add their sweetening effect but also the characteristic fruity taste so that the flavor of the treated fruit is intensified. Novel effects may be obtained by using a full-flavored fruit juice derived from a different fruit to impregnate the cherries.

Other flavoring agents: salt, citric acid, alcoholic extracts such as vanilla, lemon, mint, etc., soluble extractives from fruits or vegetables, wines, synthetic flavorings, such as vanillin and methyl anthranilate, natural fruit essenses such as those recovered by condensation or other technique from the vapors evolved in the evaporation of fruit juices, etc.

Nutritive substances: vitamins, vitamin precursors, mineral salts, proteins, solubilized starch, amino acids, sugars, etc.

Coloring materials: dyes suitable for food use, juices from highly pigmented fruits or vegetables, for instance, Concord grape juice, extractives from pigmented edible plant materials, etc.

Preserving agents: browning inhibitors such as sodium sulphite, sodium bisulphite, ascorbic acid, lemon juice, etc. Fat-stabilizing agents such as nordihydroguaiaretic acid, propyl gallate, tertiary-butylated hydroxyanisole, ethyl hydrocaffeate, etc. Agents for preventing or inhibiting microbial spoilage such as sodium benzoate, sodium parahydroxybenzoate, ethyl vanillate, antibiotics, etc.

To promote the diffusion of the food ingredients into the cherries during the conditioning operation, the concentration of the food ingredient in the edible liquid should be greater than the concentration of the same ingredient in the cherries. For example, if the cherries to be treated contain 15% sugar the concentration of sugar in the edible liquid should be higher than 20% thus to provide a driving potential for the diffusion process.

In applying the process of the invention to cherries in order to sweeten them and firm their tissue, a preferred procedure involves conditioning the cherries while they are in intimate contact with an aqueous solution containing at least 20% sugar, the conditioning being continued until the fruit and the solution each contain essentially the same concentration of sugar, within the range about from 20 to 30%, whereby the fruit and the liquid have substantially the same degree of sweetness. The resulting mixture of fruit and liquid is then preferably frozen and maintained in frozen condition until they are to be consumed.

When conducting the conditioning of cherries in the presence of a liquid preparation of a food ingredient in order to accomplish both firming of the cherries and an impregnation of the cherry tissue with the food ingredient, sufficient time must be allowed for the impregnation to take place. Obviously, the time for penetration of the food ingredient into the tissue will depend on such factors as the degree of impregnation desired, the nature of the cherries, that is, their porosity or denseness, the size of the cherries or pieces thereof, the relative concentration of the food ingredient in the surrounding liquid as compared with the concentration thereof in the cherry tissue, etc. To secure maximum penetration the conditioning is usually continued for a period from about ½ day, preferably one day, to about 6 days. The conditioning temperature is as described above, that is, the cherries are maintained in contact with the liquid containing the food ingredient at a temperature just above the freezing point of the cherries, within the range from about 25° to about 35° F. Although the conditioning temperature is high enough to keep the cherries in a thawed condition so that impregnation with the food ingredient and firming of the tissue take place at a practical rate, the temperature is not so high as to cause damage to the color, flavor, nutritive value, or sanitary condition of the fruit.

After the conditioning operation is completed, the cherries may be treated in several ways. Thus for instance the impregnated fruit with the accompanying edible liquid may be frozen and maintained in frozen storage. If desired, the fruit may be separated from residual edible liquid and the fruit frozen and maintained in frozen storage until ready for consumption. In the alternative, the separated fruit may be preserved by dehydration. The impregnated cherries with or without the residual edible liquid may be preserved by other conventional techniques such as canning, brining, candying, and the like. If the impregnated fruit is not to be preserved it may be consumed directly or used in preparation of bakery products, desserts, etc.

As noted above, a preferred technique involves a procedure wherein cherries enveloped with an edible liquid containing a food ingredient are frozen then subjected to the conditioning operation. In an alternative plan, the cherries per se are frozen then subjected to the conditioning step while maintained in contact with the edible liquid. As an example, sour cherries are washed, pitted and frozen. The frozen cherries are then placed in a vessel and mixed with sucrose solution. The resulting mixture is then subjected to the conditioning operation to cause the cherries to become firm and to cause the sugar to penetrate into the fruit tissue.

The invention is further illustrated by the following examples:

EXAMPLE II

Red sour pitted cherries were placed in cans together with enough 60° Brix sucrose syrup to cover the fruit. The cans were sealed and frozen at minus 10° F. The cans of cherries were then placed in a refrigerator maintained at 34° F., samples being withdrawn from time to time and tested for firmness and sugar content. The firmness tests were performed by placing drained cherries in a conventional "Tenderometer" and measuring the force required for the blades of the instrument to cut through the cherries. The cherries were at room temperature in conducting these tests. The results obtained are tabulated below:

*Effect of storage at 34° F. on previously frozen sugared cherries*

| Sample | Time of storage at 34° F., days | Firmness of cherries, lbs. per sq. in. | Sugar content of cherries, percent |
|---|---|---|---|
| a | zero | 41 | 20.4 |
| b | 1 | 46 | 25.6 |
| c | 2 | 54 | 26 |
| d | 3 | 60 | 26 |
| e | 6 | 60 | 28 |

All of the above products were tasted. It was observed that sample a (not conditioned) was tart whereas samples b, c, d, and e were sweet. It was also observed that all the conditioned samples of cherries had good eating texture and the degree of firmness attained even by the product stored for 6 days was not so advanced as to be considered chewy.

EXAMPLE III

Red sour cherries were washed and pitted then placed in cans. The fruit in the cans was covered with a 60° Brix solution of sucrose in water. The cans were sealed then frozen at minus 10° F. The cans of frozen product were then placed in a refrigerator maintained at 30° F. and samples were withdrawn and tested for sugar content in the fruit and surrounding syrup. In these tests the fruit and syrup were separated by draining through a sieve. The soluble solids content (largely sucrose) in the fruit and the syrup was then determined by the use of a refractometer. The following results were obtained:

| Product | Period of storage at 30° F., days | Soluble solids content, expressed as percent of sucrose | |
|---|---|---|---|
| | | Fruit | Syrup |
| A | 0 | 16 | 45 |
| B | 1 | 22.8 | 26 |
| C | 3 | 26 | 27.8 |

In addition to the above tests, the products conditioned at 30° F. (B and C) and the product which had not been conditioned (A) were tasted. It was found that products B and C were sweet and there was essentially no difference in sweetness between the fruit and the syrup. In the case of product A, the fruit was very tart whereas the syrup was very sweet. It was also noted that products B and C were firmer in texture than product A.

Having thus described my invention, I claim:

1. A process for improving the textural qualities of cherries which comprises freezing fresh cherries, then directly subjecting the cherries to a conditioning treatment wherein they are maintained in a thawed condition at a temperature just above their freezing temperature, within the range from about 25° F. to about 35° F., from about ½ to about 6 days, whereby to cause firming of the cherry tissue.

2. The process of claim 1 wherein the conditioned cherries are re-frozen and maintained in frozen storage.

3. The process of claim 2 wherein the cherries are red sour cherries having their natural moisture content.

References Cited in the file of this patent
UNITED STATES PATENTS

| | | |
|---|---|---|
| 1,480,607 | Ford | Jan. 15, 1924 |
| 2,103,925 | Zarotschenzeff | Dec. 28, 1937 |
| 2,419,877 | Birdseye | Apr. 29, 1947 |
| 2,443,866 | Noyes | June 22, 1948 |
| 2,788,281 | Guadagni | Apr. 9, 1957 |